United States Patent [19]

Nusser

[11] Patent Number: 5,531,529
[45] Date of Patent: Jul. 2, 1996

[54] INPUT APPARATUS SCALED FOR NON-ADULTS AND ADULTS HAVING SMALL HANDS

[76] Inventor: Dennis W. Nusser, 512 N. Victoria Terrace, Fort Lauderdale, Fla. 33301

[21] Appl. No.: 378,946

[22] Filed: Jan. 26, 1995

Related U.S. Application Data

[63] Continuation of Ser. No. 117,418, Sep. 7, 1993.

[51] Int. Cl.⁶ .................................................. B41J 5/12
[52] U.S. Cl. ................................... 400/472; 400/682
[58] Field of Search ........................... 400/472, 682; 341/21, 22

[56] References Cited

U.S. PATENT DOCUMENTS

| | | | |
|---|---|---|---|
| 807,556 | 12/1905 | Hotson | 400/489 |
| 3,758,697 | 9/1973 | Goldsmith | 84/425 |
| 3,940,758 | 2/1976 | Margolin | 340/337 |
| 4,536,160 | 8/1985 | Hatfield | 434/227 |
| 4,597,681 | 7/1986 | Hodges | 400/488 |
| 4,661,005 | 4/1987 | Lahr | 400/489 |
| 4,669,903 | 6/1987 | Herzog et al. | 400/489 |
| 4,725,237 | 2/1988 | Tsai | 434/327 |
| 4,736,190 | 4/1988 | Fiorella | 340/365 |
| 4,739,451 | 4/1988 | Kuba | 361/394 |
| 4,867,684 | 9/1989 | Grubb, III | 434/84 |
| 4,927,279 | 5/1990 | Morgan | 400/486 |
| 4,940,346 | 7/1990 | Liljenquist | 400/487 |
| 5,017,030 | 5/1991 | Crews | 400/485 |
| 5,044,798 | 4/1991 | Roylance et al. | 400/472 |
| 5,055,053 | 10/1991 | Hyman | 434/343 |
| 5,067,834 | 11/1991 | Szmanda et al. | 400/489 |
| 5,122,786 | 6/1992 | Rader | 340/711 |
| 5,163,765 | 11/1992 | Levy | 400/472 |
| 5,168,427 | 12/1992 | Clancy et al. | 400/632 |
| 5,334,976 | 8/1994 | Wang | 341/22 |

FOREIGN PATENT DOCUMENTS 0100221  6/1985  Japan ..................................... 341/22

OTHER PUBLICATIONS

Alison Sprout "Products to Watch" Fortune, Jan. 11, 1993, p. 87.

*Primary Examiner*—Edgar S. Burr
*Assistant Examiner*—Anthony Nguyen

[57] ABSTRACT

Input apparatus scaled for non-adult humans and adult humans having small hands. The input apparatus are especially well suited for use as computer keyboards for use by schoolchildren. Also disclosed is a computing system including the input apparatus.

8 Claims, 1 Drawing Sheet

INPUT APPARATUS SCALED FOR NON-ADULTS AND ADULTS HAVING SMALL HANDS

This application is a continuation of application Ser. No. 08/117,418 filed on Sep. 7, 1993.

BACKGROUND OF THE INVENTION

1. Field of Invention

This invention relates to input apparatus which can be used for computer, typewriter and other similar applications. It is particularly applicable where the user is a non-adult or a human with smaller than adult-sized hands. The keyboard provides fixed smaller than standard spacing to permit children as young as pre-kindergarten to use it as a touch typist. This invention relates to input apparatus and method of use and particularly to a keyboard used as an input device that is scaled to the size of the hands of non-adults and adults having small hands.

2. Description of Prior Art

Previous input apparatus such as computer keyboards and typewriters utilize a specific key spacing that has evolved into a standard. The original qwerty key arrangement is the current accepted standard for keyboard character locations. Other letter layouts such as the Dvork keyboard were developed.

Keyboard standards as to key size and spacing were published Feb. 4, 1989 as American National Standards Institute (ANSI)/Human Factors Society (HFS) Standard No. 100-1988. The Purpose of this standard is stated as "This is a technical standard that specifies conditions that have been established as representing acceptable implementation of human factors engineering principles and practices in the design of visual display terminals (VDTs), associated furniture, and the office environment in which they are placed. Human factors engineering principles and practices are highly application dependent. This technical standard is written for those VDT applications described as text processing, data entry, and data inquiry."

The key spacing described in ANSI/HFS 100 is that the center line distance between the horizontal keys shall be between 18 and 19 mm and the center line distance between the vertical keys shall be between 18 and 21 mm.

Historically in the art the various inventions of input apparatus are based upon the ANSI/HFS 100 standard which is a result of the evolution of the various input apparatus. It is seen that these various input apparatus are attached to various machines such as typewriters and computers. Historically the input apparatus were Designed for the use by adult humans. The training of an individual in the use of these various input apparatus began at the high school level. These high school users were typically 16 years old or older. At this age their hand lengths fall in the 5th percentile of an adult male's hands, meaning they are then suited to using the devices currently provided. The 5th percentile is a size that results from surveying a group of adult males and calculating the frequency in which various sizes occur. The 5th percentile is a number that one would expect 5% of adult males to resemble, on the shorter end of the scale. For example, the 5th percentile of adult males in one study had a hand length of 17.8 cm. The 95th percentile in this study had a hand length of 20.5 cm.

With the advent of the microcomputer there has been an increasing number of children and other than adult scale humans that use various input apparatus. It would be desirable to have an input apparatus which would accomodate their physical sizes, especially their hands in relation to the input apparatus. These users currently in some instances cannot perform routine keystrokes on their input apparatus due to the size and spacing of the keys. A simple, often utilized, command such as control-alternate-delete cannot be easily performed by users with small scaled hands using the devices currently provided.

SUMMARY OF INVENTION

The present invention overcomes the aforementioned disadvantages and provides input apparatus such as keyboards that permit humans with smaller than adult sized hands, such as children, that are sized to fit the smaller than adult-dimensioned hands. This invention fills the ergonomic and anthropometric needs of non-adult students by providing input apparates scaled to the size of the user's hands.

Studying the hand lengths of youths aged 4 through 16 and comparing these lengths with the 5th percentile lengths of an adult male indicates that at age 4 the children's hands are 61% of the adult, at age six 67.4%, at age eight 74.5% through age sixteen, 93%. These ranges indicate the needs for input devices of varying size.

The prior art addresses the application of input apparatus in the adult work environment. My invention is the first to suggest a fixed size input apparatus designed specifically for children and others with smaller than adult scale hands that are currently being accomodated with the existing prior art.

The ergonomic and anthropometric advantages to my invention apparently are not obvious to those skilled in the art since the input apparatus known as a fixed key computer keyboard exists only in the scale intended for adult usage. The same applies to typewriter keyboards and other input apparatus. The invention of micro computers resulted in the introduction of adult sized input apparatus to the smaller scale users.

Since touch typing is now being taught in the third grade of elementary schools, input apparatus designed for the scale of these and other non-adult students and users should be viewed as a benefit in allowing the users to be properly accomodated and therefore increase learning ability and keyboard proficiency, as well as avoid potential repetitive strain problems that might arise from using an improperly sized input apparatus.

The invention can also be used as a computing system comprised of a central processing unit, a visual display terminal, and a keyboard. This system can be comprised of separate elements or all elements within the same enclosure.

DETAILED DESCRIPTION OF THE INVENTION

Figure 1:
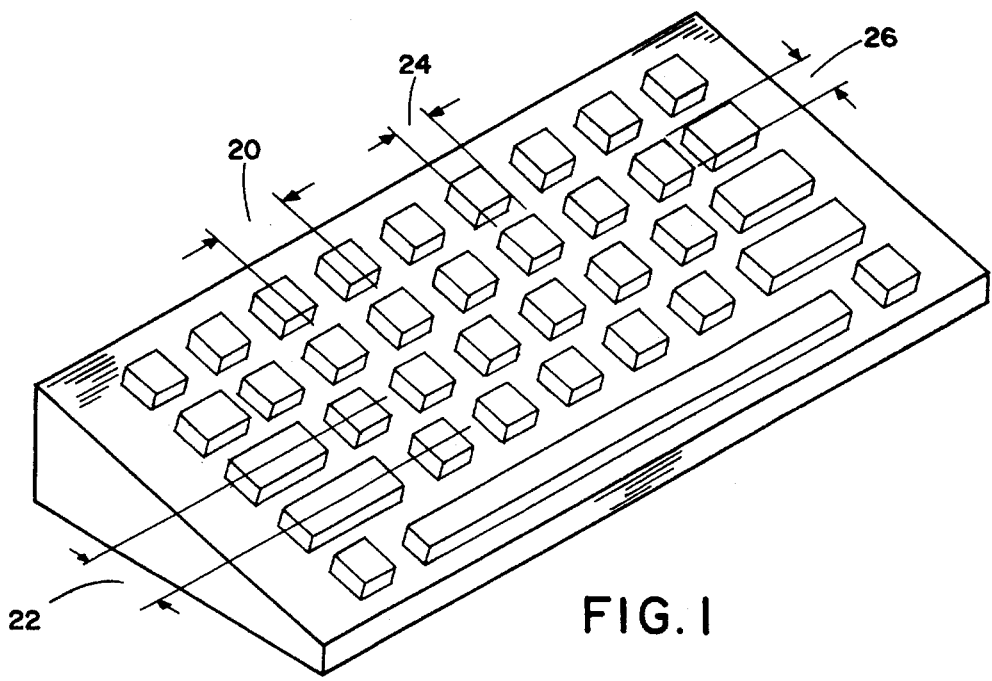
FIG. 1 shows a view of a fixed key input apparatus.
Figure 2:
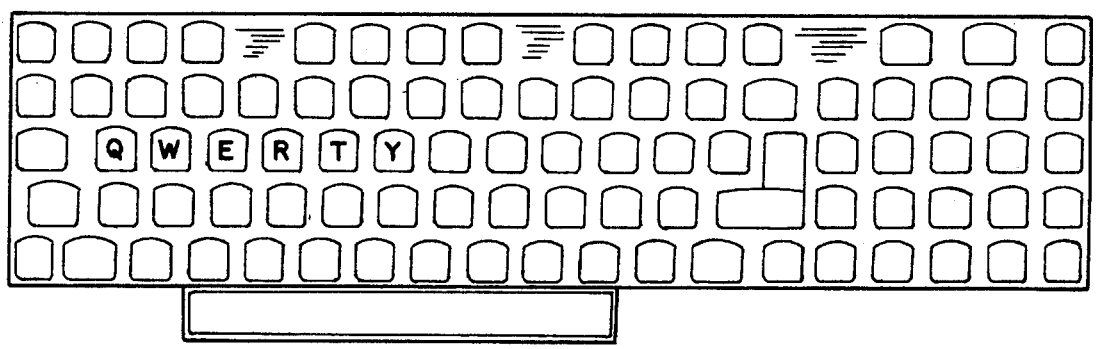
FIG. 2 shows an example of a fixed key input apparatus of the present invention.

An embodiment of the present invention is shown in FIG. 1.

With reference to FIG. 1, the centerline horizontal distance of the keys is 20. 20 can be 10.8 mm to 16.4 mm (0.425 inch and 0.646 inch). Preferable distances are 12.0 mm, 13.5 mm, and 14.5 mm for three different sizes based upon age and hand length. Other preferable distances are 12.75 mm and 14.15 mm for two different sizes based upon age and hand length.

The centerline vertical distance of the keys is 22. 22 can be 10.8 mm to 18.0 mm (0.425 inch and 0.711 inch). Preferable distances are 12.7 mm., 14.3 mm, and 15.6 mm for three different sizes based upon age and hand length. Other preferable distances are 13.45 mm and 14.9 mm for two different sizes based upon age and hand length.

Spacing for three different sizes is 65%, 73%, and 80% of the average spacing size used in the art. Spacing for two different sizes is 69% and 76.5% of the average spacing size used in the art.

The width of an individual key surface is 24. 24 can be 7.2 mm to 13 mm. Preferable distances are those that match the range selected for 20 and 22.

The depth of an individual key surface is 26. 26 can be 7.2 mm to 15 mm. Preferable distances are those that match the range selected for 20 and 22.

As will be seen in the art, most input apparatus can include keys sized differently than 24 and 26, including function keys, keypad keys, space bars, numeric keypads and the like; which would be ergonomically sized and spaced.

Other sizes within the ranges and other keyboard configurations can be accomodated as well. As will be obvious to those skilled in the art the invention also applies to typewriters and other input apparatus.

The keyboard may be produced by any technology known to the art such as U.S. Pat. Nos. 5,067,834, 5,122,786, 4,669,903, 4,661,005, and other conventional technologies known to those skilled in the art. As will be obvious to those skilled in the art the invention can be constructed as a keyboard comprised of the individual keys connecting to an electric or electronic matrix with a source of current allowing inputing electrical signals to a computer or other device. Also, ANSI/HFS 100 standards regarding other aspects of the keyboard may be utilized. Conventional keystroke travel can be used but it is preferred that the same 60% to 86% reduction used for key spacing also be used for keystroke travel, With different sizes available the user can progress from small to larger with growth.

While the above description contains many specificities, the reader should not construe these as limitation on the scope of the invention, but merely as exemplifications of preferred embodiments thereof. Those skilled in the art will envision many other possible variations within its scope. For example, skilled artisans have developed other keyboard types to address ergonomic needs of keyboard users by dividing the keyboard in half, changing the angle of the keys, etc. This invention is equally applicable to other adult-sized input apparatus in the art.

An embodiment of the input apparatus of the present invention is described in the following example:

EXAMPLE

A keyboard with the keys arranged in the manner known in the art as the "qwerty" key arrangement embodying in addition a row of 12 function keys arrayed horizontally directly above the horizontal numeric keys, a "10-key" keypad located to the right of the "qwetry" layout, cursor control keys, and various other keys as used in the art of a computer keyboard, the size and space of which is 73% of the keyboard described in the ANSI/HFS 100 standard. The overall footprint of the keyboard is 36 cm wide by 15 cm. in depth. The horizontal centerline key spacing, 20, is 13.5 mm. The vertical centerline key spacing, 22, is 14.235 mm. The key tops are, 24, 9 mm wide and, 26, 10 mm deep. The other keys are similarly scaled. The keyboard utilizes present art to provide a current response to the depression of each key or a combination of keys that is utilized by a central processing unit of a microcomputer, allowing the computer to display the information on a visual display unit.

I claim:

1. An ergonomic fixed key apparatus having keys for actuation by an operator for communicating to a processor, suitable for touch typing, said fixed key apparatus comprising:

a housing including a plurality of finger actuable keys, including alphanumeric keys, capable of being depressed through a keystroke travel range for generating desired inputs to be transmitted to the processor and arranged in substantially parallel rows to form an array;

wherein the horizontal key spacing of said alphanumeric keys is 60–86% of the range of 18 to 19 millimeters, centerline to centerline, the vertical key spacing of said alphanumeric keys is 60–86% of the range of 18 to 21 millimeters, centerline to centerline and the keystroke travel range of said alphanumeric keys is 60–86% of the range of 1.5 to 6.0 millimeters.

2. Fixed key input apparatus of claim 1 having individual key widths within the range of 7.2 mm to 13 mm.

3. Fixed key input apparatus of claim 1 having individual key depths within the range of 7.2 mm to 15 mm.

4. Fixed key input apparatus of claim 1 wherein the individual keys are arranged in a qwerty layout.

5. The ergonomic fixed key input apparatus of claim 1 wherein the percentage reduction for the horizontal and vertical key spacings is approximately equal.

6. The ergonomic fixed key input apparatus of claim 5 wherein the percentage reduction is 65% of the average for each range and the horizontal key spacing of said keys is 12.0 mm, centerline to centerline, and the vertical key spacing of said keys 12.7 mm.

7. The ergonomic fixed key input apparatus of claim 5 wherein the percentage reduction is 73% of the average for each range and the horizontal key spacing of said keys is 13.5 mm, centerline to centerline, and the vertical key spacing of said keys 14.3 mm.

8. The ergonomic fixed key input apparatus of claim 5 wherein the percentage reduction is 80% of the average for each range and the horizontal key spacing of said keys is 14.5 mm, centerline to centerline, and the vertical key spacing of said keys 15.6 mm.

\* \* \* \* \*